United States Patent [19]

Miller

[11] Patent Number: 4,511,406

[45] Date of Patent: Apr. 16, 1985

[54] DECORATIVE NONCOMBUSTIBLE COATINGS AND METHODS OF MAKING THE SAME

[75] Inventor: Charles H. Miller, North Shore, Calif.

[73] Assignee: The Pathfinders Group, Newport Beach, Calif.

[21] Appl. No.: 493,157

[22] Filed: May 10, 1983

[51] Int. Cl.$^3$ ................................................. C09D 5/14
[52] U.S. Cl. .................................... 106/18.14; 252/607
[58] Field of Search ................ 148/6.15 R; 106/18.14; 252/607

[56] References Cited

U.S. PATENT DOCUMENTS

| | | | |
|---|---|---|---|
| 3,059,046 | 10/1962 | Westervelt et al. | 106/286.4 |
| 3,082,133 | 3/1963 | Hoffmann et al. | 106/286.4 |
| 3,248,251 | 4/1966 | Allen | 106/286.2 |
| 3,645,797 | 2/1972 | Lorin | 148/6.15 R |

*Primary Examiner*—Lorenzo B. Hayes
*Attorney, Agent, or Firm*—Jerry A. Schulman; Ronald A. Sandler

[57] ABSTRACT

A decorative noncombustible coating for application to combustible materials. The noncombustible coating includes monoaluminum phosphate; an inert coloring material such as titanium dioxide; phosphoric acid; a surfactant solution; and water in an amount sufficient so that the resultant coating has a surface tension of at least about 60, but not in excess of about 80 dynes per centimeter.

9 Claims, No Drawings

DECORATIVE NONCOMBUSTIBLE COATINGS AND METHODS OF MAKING THE SAME

BACKGROUND OF THE INVENTION

The present invention is directed to noncombustible decorative coatings and methods of making them. In particular, the invention is directed to a composition which can be used as a decorative coating for walls, ceilings, floors and other supported, generally non-flexible furnishings to enhance their fire resistance and aesthetic value. The invention is particularly advantageous in flame retardant systems where the coating itself must be totally noncombustible.

On average, about 25 people per day in the United States die in fires. If trends continue, some 7,500 people will die in fires in the U.S. in 1983, and four times that number will be injured. That fire death rate per capita is almost twice the international average, and is surpassed only by Canada. As for fire incidence, the U.S. rate per capita is the highest in the world.

Because of stringent codes, most public buildings are made largely of noncombustible materials like concrete, glass, and metal. Thus, the major fire hazard is not the structure itself, but its furnishings and interior fixtures, i.e. walls, ceilings and services of the building, i.e. plumbing, electrical wiring and air conditioning. Often these items are made of combustible materials, increasing the fuel load of the buildings. It therefore is desireable to retard flame spread or prevent it entirely to decrease the fire hazards.

Also of particular consequence is the increasing use of synthetic polymers to replace wood and other natural materials. Most of the heats of combustion of synthetic polymers are much higher than those for natural materials. Once synthetic polymers ignite, the heat produced is greater than that from natural materials. It is then probable that a fire will develop faster and be even more life-threatening. Thus, it is necessary to decrease the ignitability and the rate of heat release of these combustible materials, preferably eliminating these factors completely.

According to the Center for Fire Research, the federal government's principal organization for conducting research in laboratories or fires, and a part of the National Bureau of Standards, 80% of fire deaths are due to the inhalation of smoke or hot gases and are not the result of burns. Toxic gases commonly found in fires include acrolein, hydrogen cyanide, and hydrogen chloride. These gases can be produced by certain natural materials, but hydrogen cyanide and hydrogen chloride, in particular are produced much more abundantly by many synthetic polymers than by wood. The smoke and gases accumulate near the ceiling of a room until the gases become hot enough to burn themselves. This phenomenon, called flashover, makes the fire spread furiously to all combustible objects in the room. Thus, it has become increasingly important that any flame-retardant system lower the rate and extent of smoke generation.

As is clear from these alarming statistics, fire retardant systems in the prior art have not been effective in combating the hazards of fire. The present invention, however, overcomes many of the problems of dealing with fire hazards as discussed herein.

Accordingly, an important object of the present invention is to provide a coating for furnishings and building fixtures which is totally noncombustible and eliminates flame spread.

A further object of the present invention is to provide a noncombustible coating which lowers or eliminates the ignitability of the coated material.

A still further object of the present invention is to provide a noncombustible coating which decreases the rate of heat release of the coated material.

Another object of the present invention is to provide a noncombustible coating which lowers or eliminates the rate and extent of smoke generation from the coated material.

Yet another object of the invention is to provide a noncombustible coating which is decorative and enhances the aesthetic value of the coated material.

A further object of the invention is to provide a noncombustible coating which is inexpensive to produce and easy to apply to furnishings and building fixtures.

The foregoing and other objects and advantages will appear from the following description of examples of the invention.

SUMMARY OF THE INVENTION

Briefly, in accordance with the present invention, there is provided a decorative noncombustible coating for furnishings and building fixtures which includes by weight at least about 25 parts, but not in excess of about 60 parts, of monoaluminum phosphate; at least about 35 parts, but not in excess of about 40 parts, of an inert coloring, such as titanium dioxide; at least about 1 part, but not in excess of about 3 parts, of phosphoric acid; and a surfactant solution and water in an amount sufficient so that the resulting coating has a surface tension of at least about 60, but not in excess of about 80 dynes per centimeter.

A method of making a decorative noncombustible coating of this type includes the step of mixing together the amounts of monoaluminum phosphate, phosphoric acid and a partial amount of the water sufficient to form a solution of these materials. The surfactant solution is added to this mixture. The method includes wetting the amount of titanium dioxide with an amount of water sufficient to wet the titanium dioxide. The wetted titanium dioxide then is added to the first mixture with sufficient stirring to make a uniform coating mixture. The invention, together with further objects and advantages thereof, can best be understood with reference to the following specification, taken in connection with the accompanying claims.

DETAILED DESCRIPTION OF THE INVENTION

Broadly stated, the present invention is directed to a composition for use as a decorative noncombustible coating for use on non-flexible furnishings and building fixtures. Five main components make up the coating.

The first component is monoaluminum phosphate. The purity of the component is not critical to the invention. Several commercial grades of monoaluminum phosphate are available. The component, however, could be made by reacting stoichiometric amounts of a 60% solution of aluminum sulfate $Al(SO_4)_3$ and a 60% solution of monosodium phosphate $NaH_2PO_4H_2O$. The amount of the monoaluminum phosphate incorporated into the coating is at least about 25 parts, but not in excess of about 60 parts, by weight. In the preferred embodiment, the monoaluminum phosphate is present in an amount of about 57 parts by weight.

A second component of the coating is an inert noncombustible coloring material such as clay or titanium dioxide. The purity of the titanium dioxide is not critical to the invention. Although the rutile form of titanium dioxide is used in the examples below, other forms also may be used. When the titanium dioxide is incorporated into the coating, the amount present is at least about 35 parts, but not in excess of about 40 parts, by weight. In the preferred embodiment, the titanium dioxide is present in an amount of about 39 parts by weight.

The third component of the coating is phosphoric acid. The examples listed below use an 85% concentration of phosphoric acid. Other concentrations of phosphoric acid may be used in the present invention by adjusting the amounts of the other components in the coating. The phosphoric acid is present in the coating in an amount of at least 1 part, but not in excess of about 3 parts by weight. In the preferred embodiment, the phosphoric acid is present in an amount of 2 parts by weight.

The fourth component of the coating is a surfactant solution. The surfactant solution in the present invention adjusts the surface tension of the coating. Suurface tension is defined as the attractive force exerted by the molecules below the surface upon those at the surface/air interface, often measured in dynes per centimeter. It is important that the coating maintain certain characteristics such as viscosity and spreadability so that it can be easily applied to the surfaces of combustible materials. Furthermore, the coating should cover the combustible material completely, and preferably, also be uniform. The amount of the surfactant solution present in the coating should be sufficient so that the surface tension of the coating be at least about 60, but not in excess of 80 dynes/cm. The present invention contemplates the use of any suitable surfactant, but nonylphenol is preferred.

It is generally preferred that the surfactant solution be present in an amount less than about 3 parts by weight. One such surfactant preferably used is nonylphenol, a technical grade mixture of nonylakylphenols as described at entry 6521 on page 957 of the Tenth Edition of the Merck Index. When nonylphenol is used as the surfactant, it may be used in an amount less than 1 part, and preferably is present in an amount of about 0.2 parts.

The surfactant solution also may include an alcohol for coupling with the surfactant. When nonylphenol is used as the surfactant, isopropyl alcohol is preferred. The amount of the isopropyl alcohol present is usually less than about 2 parts, or preferably, is present in an amount of about 1.7 parts by weight. The present invention, however, contemplates the use of other alcohols which perform this function.

The fifth component is water, but its purity or type is not critical to the invention. Water is used in the mixing of the monoaluminum phosphate and phosphoric acid solution. Water also is used to wet the titanium dioxide so that it may be added to this solution. The present invention includes embodiments where the amount of water is sufficient so that the resulting coating has a surface tension of at least about 60, but not in excess of 80 dynes per centimeter. The coatings contemplated herein also may include water present in an amount of at least 50 parts, but not in excess of about 70 parts, by weight. In the preferred embodiment, water is present in an amount of about 61 parts by weight.

A method of making the above coatings includes mixing together the amounts of monoaluminum phosphate, phosphoric acid, and a partial amount of the water so that a solution of these amounts is formed. This mixture may be stirred and heated in order to assure that the monoaluminum phosphate has dissolved to give a uniform base solution. The surfactant solution may be simultaneously or successively added to this base solution.

The method includes wetting the amounts of titanium dioxide or other inert coloring material with a sufficient amount of water to aid in the subsequent combining of this wetted titanium dioxide in the previously described base solution. The mixture should be sufficiently stirred to make a uniform coating mixture. The surface tension of the coating mixture may then be adjusted so as to produce the desired flow characteristics. The sequence of these steps is not critical.

The method may further include de-gassing or de-bubbling the coating mixture so as to prevent gelling. This may be accomplished by subjecting the coating mixture to a vacuum. The coating mixture then is available for packaging.

The decorative noncombustible coatings of the present invention are used by their application to the surfaces of the combustible material. A number of conventional techniques may be used to apply the coating such as by brushing, spraying, etc. The coatings of the present invention have paint-like flow characteristics and dry or harden like other paints, the time being dependent upon ambient conditions.

Having described the invention in general terms, the following example is set forth to more fully illustrate a preferred embodiment of the invention. This example, however, is not meant to be limiting. It is possible to produce still other embodiments without departing from the inventive concept herein disclosed.

EXAMPLE

A noncombustible coating of the present invention was prepared by mixing 2 grams of 85% phosphoric acid, 41 grams of water and 57 grams of monoaluminum phosphate trihydrate ($AlPO_4$-14 $3H_2O$) together to formulate a base solution. This base solution was heated to dissolve the monoaluminum phosphate and allowed to cool to room temperature.

A second mixture of 0.15 grams nonylphenol and 1.65 grams isopropyl alcohol was prepared. This mixture was then added to the base solution and stirred. After clarity is restored to the resulting mixtures, 38.9 grams of rutile titanium dioxide wetted by 20 grams of water was added and mixed thoroughly in a high speed blender. If the resultant coating contained bubbles, these bubbles were removed under vacuum to prevent gelling.

Other coatings were prepared as described above, only the percentage of the nonylphenol was changed. The surface tension of these coatings was measured and are presented in the following table:

TABLE I

| Percentage by weight nonylphenol | Surface Tension dynes/cm |
| --- | --- |
| 0.107 | 63.4 |
| 0.507 | 68.3 |
| 0.995 | 76.5 |

All of these coatings were brushed onto the surface of drywall that is commonly used in building construction. The drywall was then exposed to an open flame at 500°

C. THe coatings did not ignite and were otherwise totally noncombustible. There was no flame spread on the drywall. A negligible amount of smoke was generated.

The decorative noncombustible coatings made in accordance with the present invention are contemplated for use to prevent the combustion of otherwise combustible materials such as non-flexible furnishings and building fixtures. In particular, walls may be coated to totally eliminate flame spread. Being noncombustible itself, the coating acts as a barrier material and restricts the accessibility of oxygen for any fire starting on the wall. The wall or other combustible material becomes self-extinguishing. Applied to other combustible material, the coating of the present invention would lower or totally eliminate the possibility of the material igniting during a fire.

With all of the advantages described herein, the noncombustible coatings of the present invention can be decorative and add to the aesthetic value of the material which it coats. This is done by adding colored pigment to the coatings described herein, yet none of the attendant advantages will be lost.

From the above, it is seen that there has been provided a decorative noncombustible coating which fulfills all of the objects and advantages set forth above. The coatings of the present invention are more than fire resistant, they are totally noncombustible. The coatings can be made to be very decorative and enhance the aesthetic value of the material which they are applied to. Yet, the components of the decorative noncombustible coatings are inexpensive and easy to produce.

It has been further demonstrated that the present invention provides a decorative noncombustible coating which eliminates flame spread and the ignitability of combustible materials to which they are applied. Furthermore, since the materials to which they are applied become self-extinguishing and in fact do not burn, their rate of heat release and smoke generation are eliminated as factors contributory as fire hazards.

It should be understood that the present invention is not limited to the precise composition of the example, it being intended that the foregoing description of the presently preferred embodiments be regarded as an illustration rather than as a limitation of the present invention. It is the following claims, including all equivalents, which are intended to define the scope of the invention.

What is claimed is:

1. A decorative noncombustible coating composition for furnishings and building fixtures having a surface tension of at least about 60 but not in excess of 80 dynes/cm and comprising, in aqueous medium, by weight:
   at least about 25 parts but not in excess of about 60 parts of monoaluminum phosphate;
   at least about 35 parts but not in excess of about 40 parts of an inert noncombustible coloring material;
   at least about 1 part but not in excess of about 3 parts of phosphoric acid; and
   a surfactant solution consisting of a mixture of nonyl phenol and alcohol.

2. A decorative noncombustible coating as defined in claim 1, wherein said inert coloring material is titanium dioxide.

3. A decorative noncombustible coating as defined in claim 2, wherein the preferred amount of:
   said monoaluminum phosphate is about 57 parts;
   said titanium dioxide is about 39 parts; and
   said phosphoric acid is about 2 parts.

4. A decorative noncombustible coating as defined in claim 1, wherein:
   said nonylphenol is present in less than about 1 part;
   said alcohol is present in less than about 2 parts; and
   said water is present in at least about 50 parts but not in excess of about 70 parts.

5. A decorative noncombustible coating as defined in claim 1, wherein said alcohol is isopropyl alcohol.

6. A decorative noncombustible coating as defined in claim 4, wherein the amount of:
   said nonylphenol is about 0.2 parts;
   said alcohol is about 1.7 parts; and
   said water is about 61 parts.

7. A decorative noncombustible coating as defined in claim 1, wherein:
   said surfactant solution is present in less than about 3 parts; and
   said amount of water is at least about 50 parts but not in excess of about 70 parts.

8. A method of making the decorative noncombustible coating of claim 1 comprising the steps of:
   mixing together the monoaluminum phosphate, phosphoric acid and an amount of the water sufficient to form a solution;
   adding the surfactant solution;
   wetting the coloring matter with water; and
   adding the amounts of the wetted coloring matter to the first mixture with sufficient stirring to make a uniform coating mixture.

9. A method as defined in claim 8, wherein said method further comprises the step of de-gassing the coating mixture.

* * * * *

UNITED STATES PATENT AND TRADEMARK OFFICE
CERTIFICATE OF CORRECTION

PATENT NO. : 4,511,406
DATED : April 16, 1985
INVENTOR(S) : Charles H. Miller

It is certified that error appears in the above-identified patent and that said Letters Patent are hereby corrected as shown below:

Col. 2, line 63, replace "$NaH_2POH_2O$" with --$NaH_2PO_4-H_2O$--;

Col. 4, line 42, replace "$AlPO_4-14\ 3H_2O$" with --$AlPO_4-3H_2O$--;

Signed and Sealed this

Seventeenth Day of September 1985

[SEAL]

Attest:

Attesting Officer

DONALD J. QUIGG

Commissioner of Patents and
Trademarks—Designate